(12) United States Patent
Snyder

(10) Patent No.: US 12,453,889 B1
(45) Date of Patent: Oct. 28, 2025

(54) COLLAPSIBLE STATIONARY BICYCLE FOR TRANSPORT

(71) Applicant: Wayne Snyder, Lehighton, PA (US)

(72) Inventor: Wayne Snyder, Lehighton, PA (US)

( * ) Notice: Subject to any disclaimer, the term of this patent is extended or adjusted under 35 U.S.C. 154(b) by 162 days.

(21) Appl. No.: 18/204,461

(22) Filed: Jun. 1, 2023

Related U.S. Application Data

(60) Provisional application No. 63/347,609, filed on Jun. 1, 2022.

(51) Int. Cl.
*A63B 22/06* (2006.01)
*A63B 21/22* (2006.01)

(52) U.S. Cl.
CPC ........ *A63B 22/0605* (2013.01); *A63B 21/225* (2013.01); *A63B 2210/50* (2013.01)

(58) Field of Classification Search
CPC .............. A63B 22/0605; A63B 21/225; A63B 2210/50; B62M 9/1246
See application file for complete search history.

(56) References Cited

U.S. PATENT DOCUMENTS

| | | | | |
|---|---|---|---|---|
| 10,561,877 | B2 * | 2/2020 | Workman | A63B 22/0046 |
| 11,771,949 | B2 * | 10/2023 | Chen | A63B 22/0605 |
| | | | | 482/57 |
| 2013/0072356 | A1 * | 3/2013 | Machida | A63B 22/0023 |
| | | | | 482/58 |
| 2015/0238808 | A1 * | 8/2015 | Lin | A63B 21/225 |
| | | | | 482/57 |
| 2017/0216662 | A1 * | 8/2017 | Tung | A63B 23/03525 |
| 2019/0070476 | A1 * | 3/2019 | Bass | A63B 21/005 |
| 2021/0060380 | A1 * | 3/2021 | Hawkins, III | A63B 23/0476 |

* cited by examiner

*Primary Examiner* — Andrew M Kobylarz
(74) *Attorney, Agent, or Firm* — Joseph E. Maenner; Maenner & Associates, LLC

(57) ABSTRACT

A collapsible stationary bicycle includes a frame, a handlebar assembly adjustably attached to the frame, and a seat assembly adjustably attached to the frame. A pedal assembly is rotatably attached to the frame. The pedal assembly has a flywheel operatively attached to the pedal assembly. A forward outrigger assembly is adjustably attached to the frame and a rear outrigger assembly is adjustably attached to the frame.

13 Claims, 5 Drawing Sheets

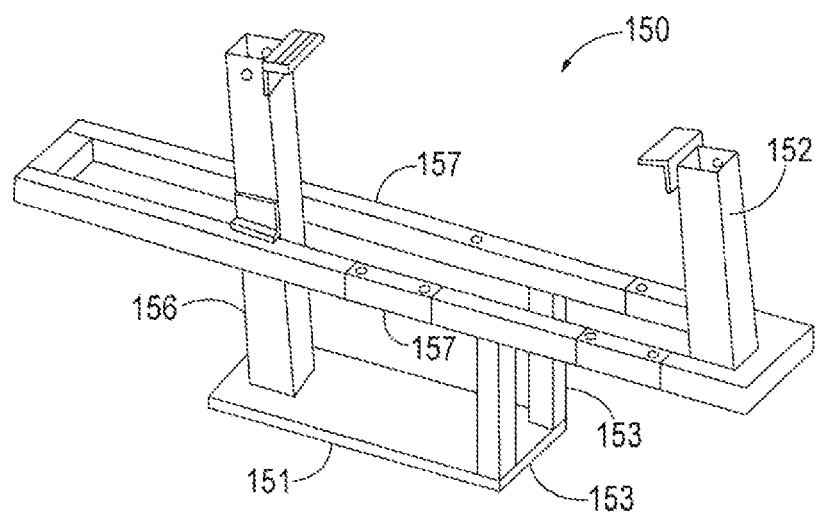
FIG. 3
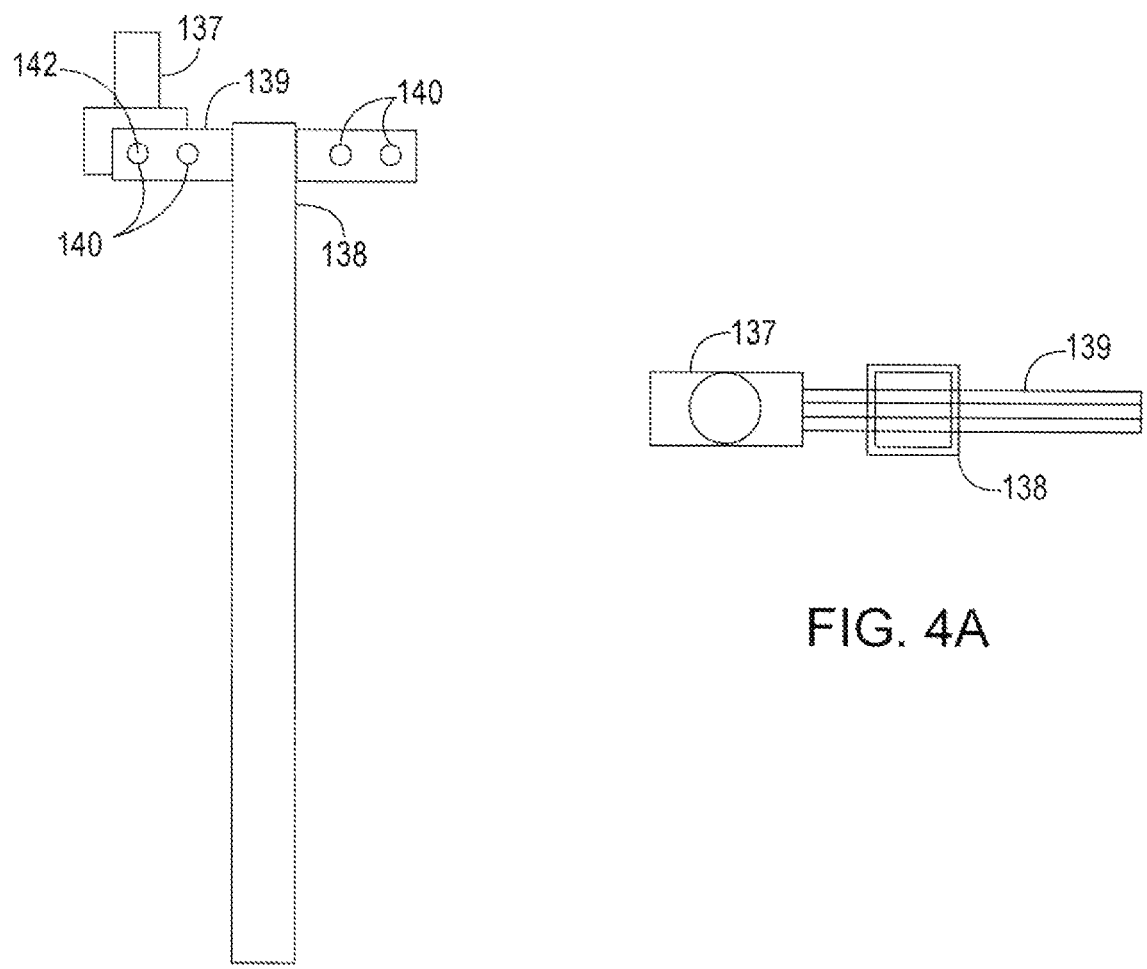
FIG. 4
FIG. 4A

COLLAPSIBLE STATIONARY BICYCLE FOR TRANSPORT

CROSS-REFERENCE TO RELATED APPLICATION

The present application claims the benefit of U.S. Provisional Patent application Ser. No. 63/347,609, filed on Jun. 1, 2022, which is incorporated herein by reference in its entirety.

BACKGROUND OF THE INVENTION

Field of the Invention

The invention relates to a collapsible stationary bicycle that can be broken down for easy transportation.

Description of the Related Art

Stationary cycling classes are popular with multiple students riding individual stationary bicycles in a gym. A drawback is that these bicycles are large and cumbersome, and are not easily moved to other locations, such as outside of the gym building and into a parking lot, for example, to provide the cyclists with different scenery while exercising on their bicycles.

It would be beneficial to provide a collapsible, easily transportable stationary bicycle to enable a number of these bicycles to be transported to different locations for different cycling classes.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a collapsible stationary bicycle that includes a frame, a handlebar assembly adjustably attached to the frame, and a seat assembly adjustably attached to the frame. A pedal assembly is rotatably attached to the frame. The pedal assembly has a flywheel operatively attached to the pedal assembly. A forward outrigger assembly is adjustably attached to the frame and a rear outrigger assembly is adjustably attached to the frame.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 3 is a perspective view of a frame used with the bicycle of FIG. 1;

FIG. 4 is a side elevational view of a seat assembly support used with the bicycle of FIG. 4A is a top plan view of the seat assembly support of FIG. 4;

DETAILED DESCRIPTION

Figure 1:
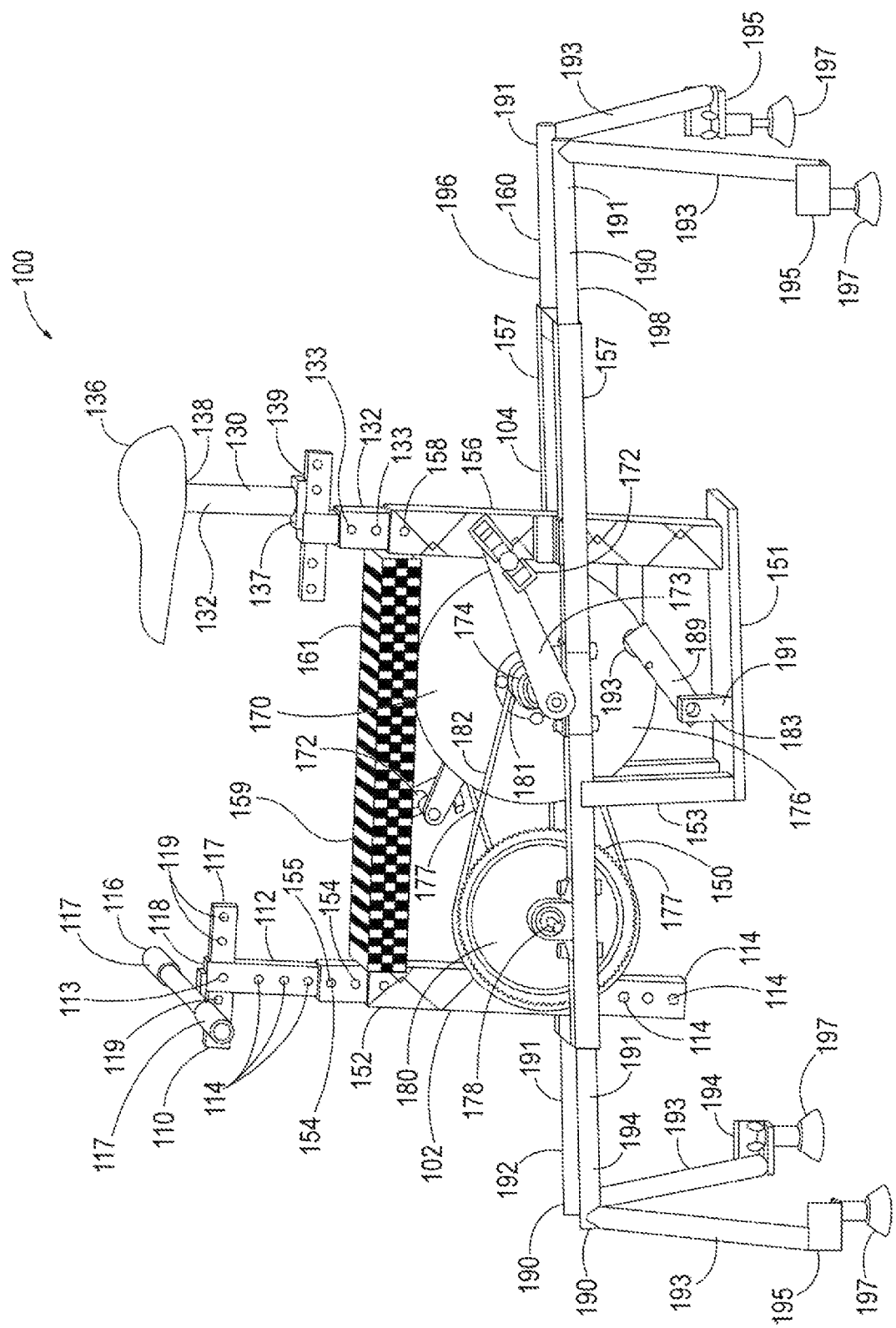
FIG. 1 is a left side elevational view of a collapsible bicycle according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Stationary bicycles are very useful for exercise for persons who either cannot or do not desire to ride a real bicycle outside of the streets. One particular use of stationary bicycles is in "SPIN®" classes, where several riders are on their own bicycle in a room facing an instructor who leads the class. These classes tend to be held indoors in a gym, taking up a substantial amount of floor space in the gym.

The present invention takes the stationary bicycle "outdoors" and allows the bicycle to be readily transported to temporary locations, such as in a park or a parking lot to provide for "outdoor" exercise on the bicycle. The inventive bicycle is collapsible into a compact unit to allow for storage, as well as to allow the bicycle to be inserted into its own travel case for transport.

Referring to the Figures, a collapsible stationary bicycle 100 ("bicycle 100") according to an exemplary embodiment of the present invention is shown. Bicycle 100 is configurable between an operating configuration, wherein bicycle 100 can be ridden by a rider, and a storage and transport configuration, wherein the bicycle 100 can be inserted into a carrying case (not shown) for storage and transport. The case can be the size of a typical small suitcase having dimensions of about 30 inches×22 inches×12 inches. The case can include wheels and one or more handles, as is common with a typical suitcase.

Figure 2:
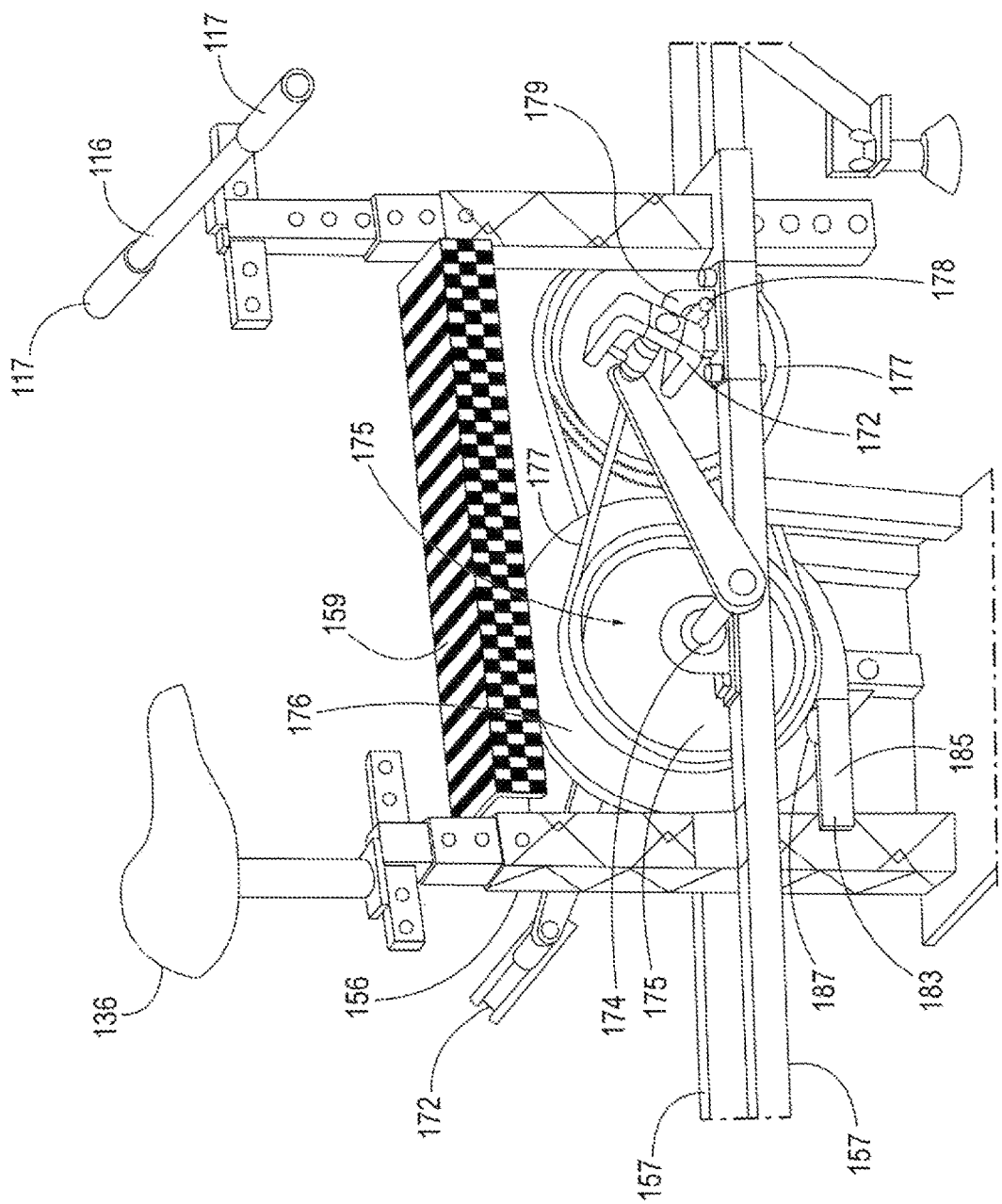
FIG. 2 is a right rear perspective view of the bicycle of FIG. 1.

FIG. 1 shows a side elevational view of bicycle 100 and FIG. 2 shows a rear perspective view of bicycle 100 in an operational configuration. Bicycle 100 includes components well known in prior art stationary bicycles, including a handlebar assembly 110 at a front end 102 of bicycle 100; a seat assembly 130 at a rear end 104 of bicycle 100; a frame assembly 150 supporting handlebar assembly 110 and seat assembly 130, as well as a pedal and flywheel assembly 170 located between handlebar assembly 110 and seat assembly 130.

As shown in FIG. 3, frame assembly 150 includes a generally planar base 151 that sits on a surface, such as a floor, during use. A pair of central supports 153 extends upwardly from a front part of base 151. Each of central supports 153 and supports horizontal frame members 157. A vertical front part 152 of frame extends upwardly from a front portion of horizontal frame members 157. An upper frame member 159 ties together top ends of vertical front part 152 of frame 150 and rear part 156 of frame assembly 150. In an exemplary embodiment, upper frame member 159 is removable from frame assembly 150.

Handlebar assembly 110 includes a vertical support bar 112 telescopically inserted into front part 152 of frame assembly 150. Vertical support bar 112 includes a plurality of height adjustment slots 114 that can be aligned with a corresponding slot 154 in front part 152 of frame assembly 150. Vertical support bar 112 can be adjusted vertically so that a desired adjustment slot 114 aligns with corresponding slot 154. A pin 155 can be removably inserted into corresponding slot 154 and adjustment slot 114 to temporarily lock in the height of handlebar assembly 110.

A handlebar 116 is attached to the top 118 of vertical support bar 112 via an adjustable member 117. As shown in FIG. 1, handlebar 116 also adjustable horizontally fore and aft by aligning slots 119 in member 117 with a slot 113 in vertical support bar 112. A pin (not shown) can be removably inserted through slot 113 and a selected slot 119. Handlebar 116 can include also handgrips 117 that telescopically extend from or telescopically slide over handlebar 116 to further reduce the width of handlebar assembly 110 for transport.

Seat assembly 130 includes a vertical support bar 132 telescopically inserted into rear part 156 of frame assembly 150, with the rear part 156 of frame assembly 150 extending upwardly from base 151. Vertical support bar 132 includes a plurality of height adjustment slots 133 that can be aligned with a corresponding slot 158 in rear part 156 of frame assembly 150. Vertical support bar 132 can be adjusted vertically so that a desired adjustment slot aligns with corresponding slot 158. A pin (not shown) can be removably inserted into corresponding slot 158 and adjustment slot to temporarily lock in the height of seat assembly 130.

A seat 136 is attached to the top 138 of vertical support bar 132. Referring to FIGS. 4 and 4A, seat 136 is horizontally adjustable-closer or farther from handlebar 116—by sliding seat 136 on a base 137 along a longitudinally extending track 139. Seat 136 can be releasably locked to track 139 along the length of track 139, as desired by aligning through opening 142 in base 137 with one of a plurality of through openings 140 in track 139 and pinning base 137 in track 139 with a pin (not shown).

Referring back to FIGS. 1 and 2, pedal and flywheel assembly 170 includes a pair of pedals 172 attached to a shaft 174 via a pedal arm 173. Pedals 172 can be releasably attached to pedal arm 173 to reduce the footprint of bicycle 100 for transport.

A pedal gear 175 is fixed to shaft 174 and rotates with pedals 172. A flywheel 176 loosely rests on, but is not attached to, shaft 174 adjacent to pedal gear 175 so that flywheel can rotate freely relative to shaft 174. A reduction gear assembly 177 is mounted forward of shaft 174 on an idler shaft 178 and includes a first, smaller gear 179 coupled to idler shaft 178. A first belt 177 is wrapped around pedal gear 175 and gear 179. Idler shaft 178 also includes a second, larger gear 180 fixed to idler shaft 178. A flywheel gear 181 is attached to flywheel 176. A second belt 182 is wrapped around larger gear 180 and flywheel gear 181.

When pedals 172 are rotated by a user, pedal gear 175 rotates, which in turn rotates both gears 179 and 180 on idler shaft 178 via first belt 177. That rotation in turn drives second belt 182 to rotate flywheel gear 181 and, consequently, flywheel 176. In an exemplary embodiment, a reduction ration between pedal gear 175 and flywheel gear 181 is about 12:1, although those skilled in the art will recognize that other reduction ratios can be used.

Figure 5:
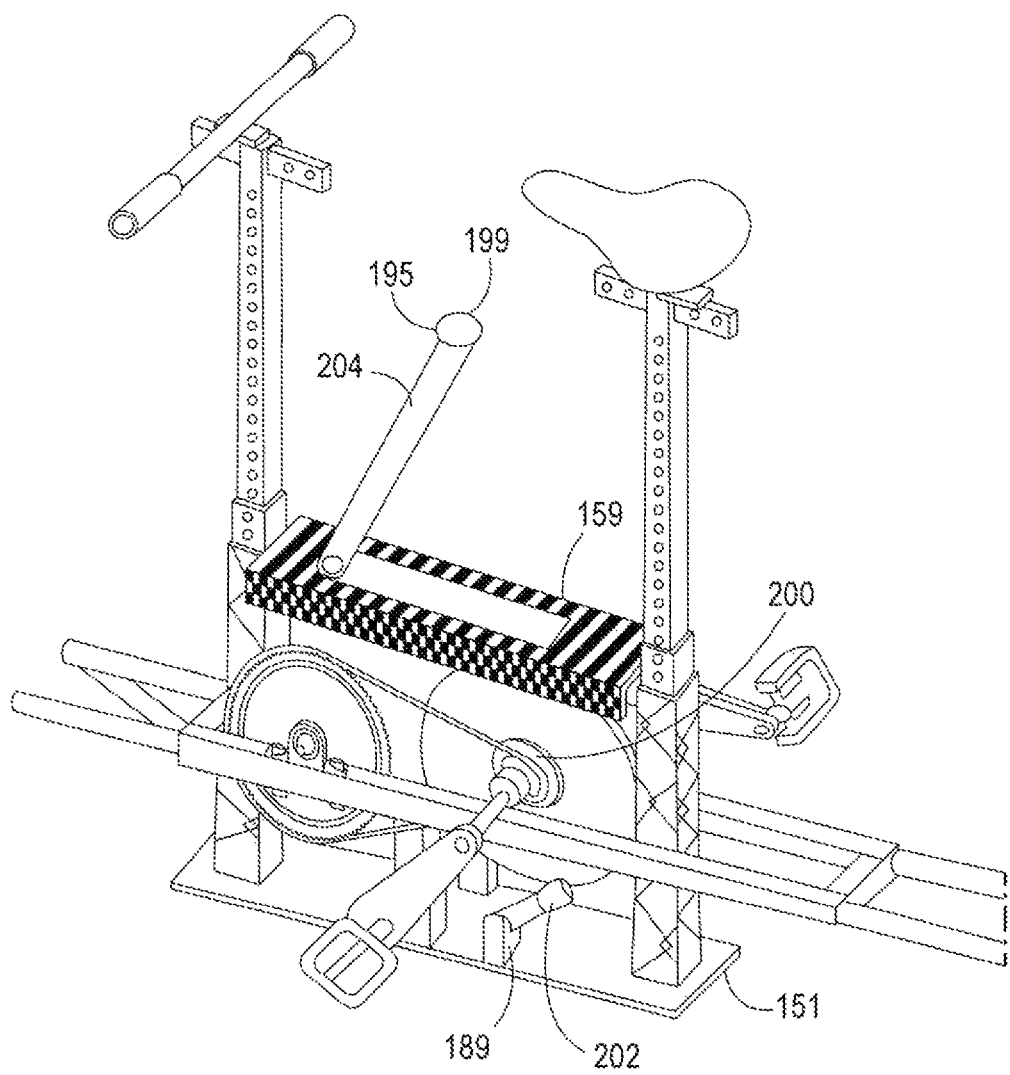
FIG. 5 is a left rear perspective view of a magnet adjuster assembly used to adjust the flywheel magnet.

An adjustable magnetic force assembly 183, shown in FIGS. 1 and 2, rides along the perimeter of the flywheel 176 to provide resistance that simulates riding conditions. Magnetic force assembly 183 includes a fixed magnet member 185 that extends from rear part 156 of frame assembly 150 so that a first magnet 187 directly faces flywheel 176. A movable magnet member 189 is pivotally attached to rear part 156 of frame assembly 150 on a pivot mount 191. A second magnet 193 is mounted on movable magnet member 189 and is connected to an adjustment knob assembly 199 via a pull cable 200, as shown in FIG. 5. Pull cable 200 has a first end 202 attached to movable magnet member 189 and a second end attached to adjustment knob assembly 199.

Pull cable 200 runs through an upper frame member 159 and into a lever arm 204, which is pivotally attached to upper frame member 159 and extends outward from upper frame member 159, as shown in FIG. 5. As adjustment knob assembly 199 is adjusted, cable 200 is pulled or released to lift or lower movable magnet member 189. This adjustment moves magnet 193 relative to magnet 187, thereby changing the amount of force exerted on flywheel 176 and, thus, the amount of force required by a rider to rotate pedals 172 and flywheel 176.

Referring to FIGS. 1 and 2, bicycle 100 also include a set of outriggers 190 that can be extended to stabilize bicycle 100 for riding. Outriggers 190 include a right forward outrigger 192, a left forward outrigger 194, aa right rear outrigger 196, and a left rear outrigger 198. Each of outriggers 190 includes a horizontal portion 191 that slides into/out of upper frame member 159, a vertical support portion 193 extending generally orthogonally to an end of horizontal portion 191, a base member 195 attached to a lower end of vertical support portion 193, and an adjustable foot 197 that is adjustably attached to base member 195. The height of foot 197 relative to base 195 can be adjusted to level assembly 100.

In a transport condition, outriggers 190 rotate upwardly toward handlebar 116 and seat 136 and telescopically slide into frame assembly 150, forming a footprint of about 10 inches wide. Outriggers 190 can be rotated away from each other to stabilize bicycle 100, as shown in FIG. 1. When outriggers 190 are extended and bicycle 100 is configured for riding, bicycle 100 has a footprint of about 26 inches wide×29 inches long.

Figure 6:
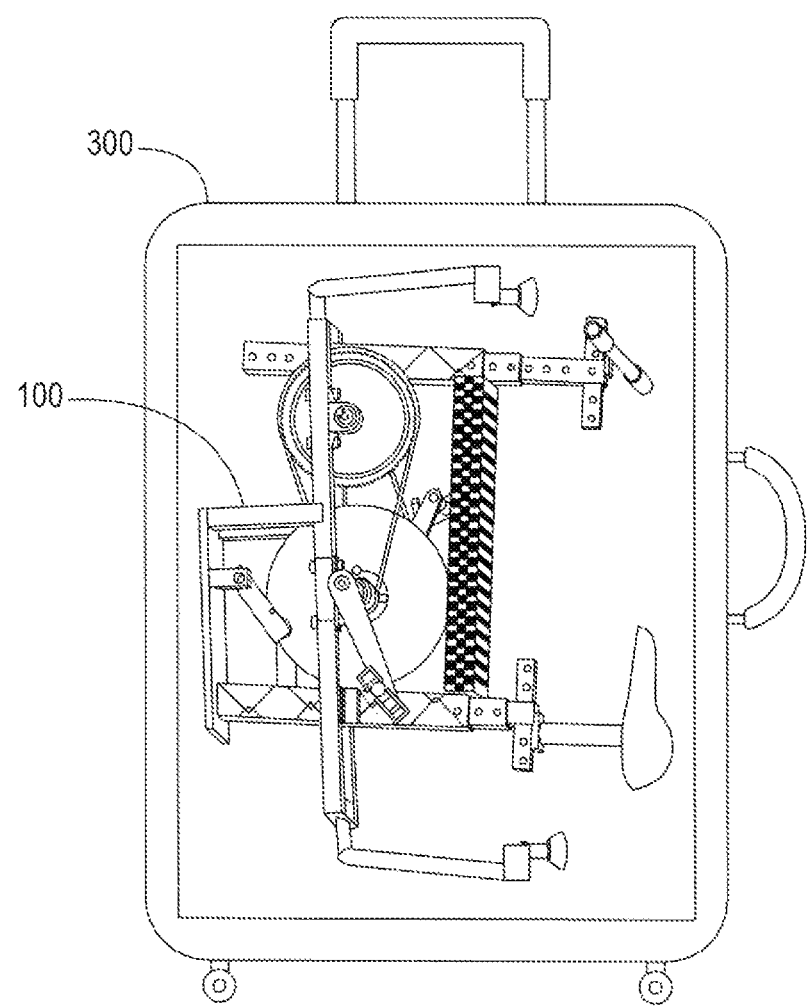
FIG. 6 is a perspective view showing the bicycle of FIG. 1 stored in a container for storage and transport.

With handlebar assembly 110, seat assembly 130, and outriggers 190 positioned in a transport configuration and pedals 172 folded up, bicycle 100 has overall dimensions of about 28 inches×20 inches×8 inches and can fit into a container for storage and transport, as shown inside a container 300 in FIG. 6.

A benefit to bicycle 100 is that bicycle 100 has a first height when bicycle 100 is configured for riding and a second height, less than the first height, when bicycle 100 is configured for storage and transport. Further, bicycle 100 has a first length when bicycle 100 is configured for riding and a second length, less than the first length, when bicycle 100 is configured for storage and transport. Additionally, bicycle 100 has a first width when bicycle 100 is configured for riding and a second width, more than one half smaller than the first width, when bicycle 100 is configured for storage and transport. In an exemplary embodiment, bicycle 100 weighs less than 50 pounds to add to the ease of portability of bicycle 100.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A collapsible stationary bicycle comprising:
   a frame;
   a handlebar assembly adjustably attached to the frame;
   a seat assembly adjustably attached to the frame;
   a pedal assembly rotatably attached to the frame, the pedal assembly having a flywheel operatively attached thereto;
   a forward outrigger assembly adjustably attached to the frame; and
   a rear outrigger assembly adjustably attached to the frame,
   wherein the forward outrigger assembly and the rear outrigger assembly are extendible from a first position inserted into the frame to a second position extended longitudinally from the frame.

2. The collapsible stationary bicycle according claim 1, wherein the handlebar assembly is telescopically attached to the frame.

3. The collapsible stationary bicycle according to claim 1, wherein the rear outrigger assembly comprises a right rear outrigger and a left rear outrigger.

4. The collapsible stationary bicycle according to claim 1, wherein the forward outrigger assembly comprises a right forward outrigger and a left forward outrigger.

5. The collapsible stationary bicycle according to claim 1, wherein each of the forward and rear outrigger assemblies are removably attached to the frame.

6. The collapsible stationary bicycle according to claim 1, wherein collapsible stationary the bicycle has a first height when the collapsible stationary bicycle is configured for riding and a second height, less than the first height, when the collapsible stationary bicycle is configured for storage and transport.

7. The collapsible stationary bicycle according to claim 1, wherein the collapsible stationary bicycle has a first width when the collapsible stationary bicycle is configured for riding and a second width, more than one half smaller than the first width, when the collapsible stationary bicycle is configured for storage and transport.

8. The collapsible stationary bicycle according to claim 1, wherein the collapsible stationary bicycle has a first length when the collapsible stationary bicycle is configured for riding and a second length, smaller than the first length, when the collapsible stationary bicycle is configured for storage and transport.

9. A collapsible stationary bicycle for transport, comprising:
   a frame;
   a handlebar assembly adjustably attached to the frame;
   a seat assembly adjustably attached to the frame;
   a pedal assembly rotatably attached to the frame, the pedal assembly having a flywheel operatively attached thereto;
   a forward outrigger assembly adjustably attached to the frame; and
   a rear outrigger assembly adjustably attached to the frame; and
   a case configured to store and transport the collapsible stationary bicycle when the collapsible stationary bicycle is in a storage and transport configuration.

10. The collapsible stationary bicycle according to claim 9, wherein the collapsible stationary bicycle has a first height when the collapsible stationary bicycle is configured for riding and a second height, less than the first height, when the collapsible stationary bicycle is configured for storage and transport.

11. The collapsible stationary bicycle according to claim 9, wherein the collapsible stationary bicycle has a first width when the collapsible stationary bicycle is configured for riding and a second width, more than one half smaller than the first width, when the collapsible stationary bicycle is configured for storage and transport.

12. The collapsible stationary bicycle according to claim 9, wherein the collapsible stationary bicycle has a first length when the col stat bicycle is configured for riding and a second length, smaller than the first length, when the collapsible stationary bicycle is configured for storage and transport.

13. A collapsible stationary bicycle comprising:
a frame;
a handlebar assembly adjustably attached to the frame;
a seat assembly adjustably attached to the frame;
a pedal assembly rotatably attached to the frame, the pedal assembly having a flywheel operatively attached thereto; outrigger
a forward outrigger assembly adjustably attached to the frame; and
a rear outrigger assembly adjustably attached to the frame, wherein the forward outrigger assembly and the rear outrigger as assembly are rotatable from a first position longitudinally aligned with the frame to a second position rotated away from the frame.

* * * * *